(12) United States Patent
Zangerl et al.

(10) Patent No.: US 11,921,281 B2
(45) Date of Patent: Mar. 5, 2024

(54) ATTACHMENT DEVICE FOR AN EYEPIECE OR AN OBJECTIVE LENS OF A LONG-RANGE OPTICAL DEVICE

(71) Applicant: Swarovski-Optik AG & Co KG., Absam (AT)

(72) Inventors: Alois Zangerl, Absam (AT); Martin Kuhn, Rieden (AT); Michael Socher, Lans (AT); Philipp Gimpl, Absam (AT)

(73) Assignee: Swarovski-Optik AG & Co KG. (AT)

( * ) Notice: Subject to any disclaimer, the term of this patent is extended or adjusted under 35 U.S.C. 154(b) by 0 days.

(21) Appl. No.: 17/743,890

(22) Filed: May 13, 2022

(65) Prior Publication Data
US 2022/0365335 A1 Nov. 17, 2022

(30) Foreign Application Priority Data
May 14, 2021 (AT) .............................. A 50375/2021

(51) Int. Cl.
*G02B 25/00* (2006.01)
*G02B 23/12* (2006.01)

(52) U.S. Cl.
CPC ............ *G02B 25/001* (2013.01); *G02B 23/12* (2013.01)

(58) Field of Classification Search
CPC .............................. G02B 25/001; G02B 23/12
USPC .................................................. 359/643, 820
See application file for complete search history.

(56) References Cited

U.S. PATENT DOCUMENTS

| 7,213,360 | B1 | 5/2007 | Galloway et al. |
| 7,645,961 | B2 * | 1/2010 | Hernando Fernandez ................... B60S 1/026 348/148 |
| 2018/0100722 | A1 | 4/2018 | McDaniels |

FOREIGN PATENT DOCUMENTS

| DE | 3538419 C1 | 12/1986 |
| DE | 29616396 U1 | 2/1997 |
| DE | 202010016405 U1 | 2/2011 |
| FR | 2296863 A1 | 7/1976 |

* cited by examiner

*Primary Examiner* — William Choi
(74) *Attorney, Agent, or Firm* — Lerner David LLP

(57) ABSTRACT

The invention relates to an attachment device for at least one objective lens and/or at least one eyepiece of a long-range optical device, in particular in the form of a riflescope, a telescope or a binocular, wherein the attachment device comprises at least one window, which is transparent at least in a visible spectral range, as well as at least one electrical heating device for the window.

25 Claims, 6 Drawing Sheets

ATTACHMENT DEVICE FOR AN EYEPIECE OR AN OBJECTIVE LENS OF A LONG-RANGE OPTICAL DEVICE

CROSS REFERENCE TO RELATED APPLICATION

The present application claims priority from Austrian Patent Application No. A 50375/2021 filed on May 14, 2021, the disclosure of which is hereby incorporated by reference.

BACKGROUND OF THE INVENTION

The invention relates to an attachment device for at least one objective lens and/or at least one eyepiece of a long-range optical device, in particular in the form of a riflescope, a telescope or a binocular.

The invention further relates to a long-range optical device, in particular in the form of a riflescope, a telescope or a binocular.

BRIEF SUMMARY OF THE INVENTION

Depending on the surrounding conditions in which the long-range optical device is used by a user, for example at low ambient temperatures, it is possible that the long-range optical device fogs up due to the breath of the user or due to increased air humidity and a proper view through the long-range optical device is impaired or prevented. In particular, fogging of an eyepiece lens of the long-range optical device due to breathing air condensing on the surface of the lens may occur. However, a similar situation may also occur on the field side on an objective lens. If the long-range optical device, for example, is a riflescope, the case that aiming is not possible any more due to fogging may occur.

Thus, it is an object of the present invention to overcome the shortcomings of the prior art and to prevent fogging of the long-range optical device impairing a view through the long-range optical device.

This object is achieved by an attachment device of the initially mentioned type according to invention in that the attachment device comprises at least one window, which is transparent at least in a visible spectral range, as well as at least one electrical heating device for the window.

In the present context, a window is understood as a region in the attachment device which is at least partly transparent in the visible spectral range.

Surfaces of the window can, for example, be flat, curved or be formed as a mixture of flat and curved regions. A flat window can be embodied as a pane and/or be referred to as pane. A curved window can be embodied as a lens and/or be referred to as lens.

By the solution according to the invention, it can be guaranteed in a simple manner by heating the window that fogging of an outer side, which is optically effective with respect to the surroundings, of the long-range optical device is prevented. Moreover, by the arrangement of the attachment device, the eyepiece and/or the objective lens is shielded and protected against fogging. Furthermore, the solution according to the invention allows for simple retrofitting of existing long-range optical devices. The advantage of this is that the optical system of the long-range optical device remains unchanged when the attachment device is mounted. The fact that after demounting the attachment device, the long-range optical device can be brought back into its initial state which it had before mounting may be considered a further advantage.

It has proven to be particularly advantageous for the heating device to comprise at least one electrically conductive heating layer applied to a surface of the at least one window. This variant allows for direct heating directly on those locations of the window at which an increased temperature is required to prevent fogging of the window. By this variant of the invention, a very high degree of effectiveness may be achieved.

In a preferred variant of the invention, the attachment device comprises at least one heating controller which is configured to control the heating power, in particular a flow of current through the at least one heating layer. This variant of the invention allows for targeted adjustment of the temperature of the window.

Moreover, the at least one heating controller may comprise at least one processor and/or at least one pulse width modulator and/or at least one pulse duration modulator. This variant of the invention allows for a pulsed flow of current through the heating layer to be generated and for the heating power to be adjusted in a targeted manner. The advantage of this is that the heating power can be adapted and readjusted. Any electronic component, which can be programmed and can evaluate data, such as an FPGA (field-programmable gate array), an ASIC, a microcontroller, a microprocessor or a digital signal processor DSP etc., is to be considered a processor.

To impair a view through the sight channel of the long-range optical device as little as possible, it has proven to be particularly advantageous that the window with the at least one electrically conductive heating layer has a transmittance in the visible spectral range of more than 80%, in particular of more than 90%.

A spatially targeted heating of a window can be achieved in that a width and/or a layer thickness of the at least one electrically conductive heating layer varies. At the locations at which the heating layer is narrower and/or thinner, the local resistance of the heating layer increases, and at these locations, when a current flows, the heating layer is heated more than at locations which are wider or thicker as compared thereto. This is particularly advantageous if these regions, which are heated more, are located in the region of the extension of the optical axis of the long-range optical device. Thus, it is ensured that the long-range optical device is very quickly operational again at least partly in the case of fogging.

Moreover, it may also be provided that the electrically conductive heating layer, in particular with a constant layer thickness, is applied to at least one surface of the window, and covers at least 20%, in particular at least 30%, preferably at least 60%, particularly preferred at least 85%, for example 100%, of this surface.

According to an advantageous advancement of the invention, it may be provided that the electrically conductive heating layer is connected to a supply circuit via at least one flexible flat strip with at least one conducting path and/or with an electrically conductive material. This variant of the invention allows for very good protection of the electrical lines for contacting the heating layer from humidity and mechanical damage, for example bucklings or breaks, while, simultaneously, the assembly of the attachment device is significantly facilitated and a very flat and space-saving structure is ensured.

According to a preferred advancement, the flexible flat strip may comprise at least two contact points for electrically contacting the electrical heating layer.

Moreover, it is favorable if the flexible flat strip comprises a loop-shaped section forming an eye in the region of the window allowing a free view at least on a central section of the window, wherein the contacting points are arranged on the loop-shaped section.

Furthermore, it may be provided that at least one strip-shaped section, which is electrically connected to the supply circuit, in particular via a ZIF contact, adjoins the loop-shaped section of the flexible flat strip.

In a variant of the invention, the at least one window may comprise a planar base surface and a planar top surface, wherein the base surface and the top surface are preferably embodied being plane parallel to one another. The advantage of this variant is that it can particularly easily be achieved that the window is largely optically neutral and the total focal length of the long-range optical device remains unaffected by the attachment device, such that the total focal length of the long-range optical device with the attachment device corresponds to the total focal length of the same long-range optical device without the attachment device.

In order to enable a view undisturbed by reflections and to minimize transmission losses, the window may have at least one anti-reflective coating, wherein the window is preferably provided with the anti-reflective coating on both sides and thus has an anti-glare effect.

Particularly simple mounting and demounting of the attachment device to the long-range optical device may be achieved in that it is embodied as a push-on lid for the at least one eyepiece and/or at least one objective lens of the long-range optical device.

A variant, which also ensures very good protection of a region covered by the window from environmental impacts is characterized in that the attachment device comprises a housing with at least one tube-shaped section, wherein the window is received in the tube-shaped section and closes it on one side, wherein a diameter of the window is preferably larger than a length of the tub-shaped section.

The protection from environmental impacts may be further increased in that the attachment device comprises at least one seal insulating at least one edge of the window thermally and/or against the Ingress of moisture or foreign objects.

Mounting and demounting the attachment device on a riflescope is further facilitated in that the tube-shaped section comprises at least one clamping device for fastening on the at least one eyepiece or at least one objective lens.

Moreover, it may be provided that the attachment device comprises at least one receiving compartment for an electrical energy storage serving as a voltage source, which can be closed by at least one cover, in particular for at least one battery or for at least one accumulator.

In a variant of the invention, which allows for optimum use of the available space when the attachment device is mounted and which does not impair handling of the long-range optical device, it is provided that the receiving compartment for the electrical energy storage is connected, in particular via a web, with the tube-shaped section.

In this regard, it is particularly preferred that a longitudinal extension of the tube-shaped section and a longitudinal extension of the receiving compartment extend in parallel to one another.

In order to ensure protection of the window from damage, such as scratching or removal of a coating, such as the heating layer or the anti-reflective coating, the attachment device may comprise at least one pivotably mounted cover for the window.

Particularly easy, comfortable and user-friendly switching on and off of the heating device may be achieved in that the attachment device is configured to activate the heating device and heat the window when the cover is pivoted from a position covering the window into a position in which the window is released, and/or to deactivate the heating device when the cover is closed.

However, alternatively or additionally, the heating device may also be configured to activate and/or deactivate the heating device depending on at least one signal generated by at least one inclinometer and/or at least one proximity sensor and/or at least one fogging sensor.

It has proven to be particularly advantageous for the electrically conductive heating layer to be made of at least one thin and transparent metal layer and/or at least one transparent, electrically conductive oxide, for example indium tin oxide (ITO), antimony doped tin oxide (ATO), fluorine doped tin oxide (FTO), aluminum doped zinc oxide (AZO) or comprises at least one of said materials.

Furthermore, the window may be made of at least one plastic material and/or at least one glass and/or at least one ceramic and/or mineral and/or crystalline material, or may comprise at least one of said materials.

The aforementioned object can also be achieved according to the invention by a long-range optical device of the initially mentioned type in that the long-range optical device comprises at least one attachment device according to one of claims 1 to 25, wherein the attachment device is arranged on the eyepiece side of a housing of the long-range optical device or on the objective side of the housing of the long-range optical device and the eyepiece or the objective lens is covered from the surroundings by the attachment device.

It is particularly preferred that in an eyepiece-side arrangement of the attachment device on the housing of the long-range optical device, a distance between the window and an eyepiece of the long-range optical device amounts to a maximum of 10 mm, in particular to a maximum of 5 mm.

In this regard, it is advantageous if a distance between an eyepiece facing side of the window of the attachment device and a window facing outer side of an eyepiece closing lens of the long-range optical device amounts to a maximum of 20 mm, in particular to a maximum of 10 mm. Hence, it is ensured that the safety distance between the head of the shooter and the riflescope with the attachment device, which is required to prevent injuries during recoil when a firearm is fired and on which the riflescope is mounted, is not significantly reduced when the attachment device is mounted to the eyepiece of a riflescope.

This can be ensured if an outermost surface or edge, facing the user, of the tube-shaped section of the attachment device when mounted on the eyepiece does not project by more than 25 mm, in particular not by more than 15 mm, over an outermost surface or edge, facing the user, of the long-range optical device.

For the purpose of better understanding of the invention, it will be elucidated in more detail by means of the figures below.

BRIEF DESCRIPTION OF THE DRAWINGS

These show in a respectively very simplified schematic representation.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
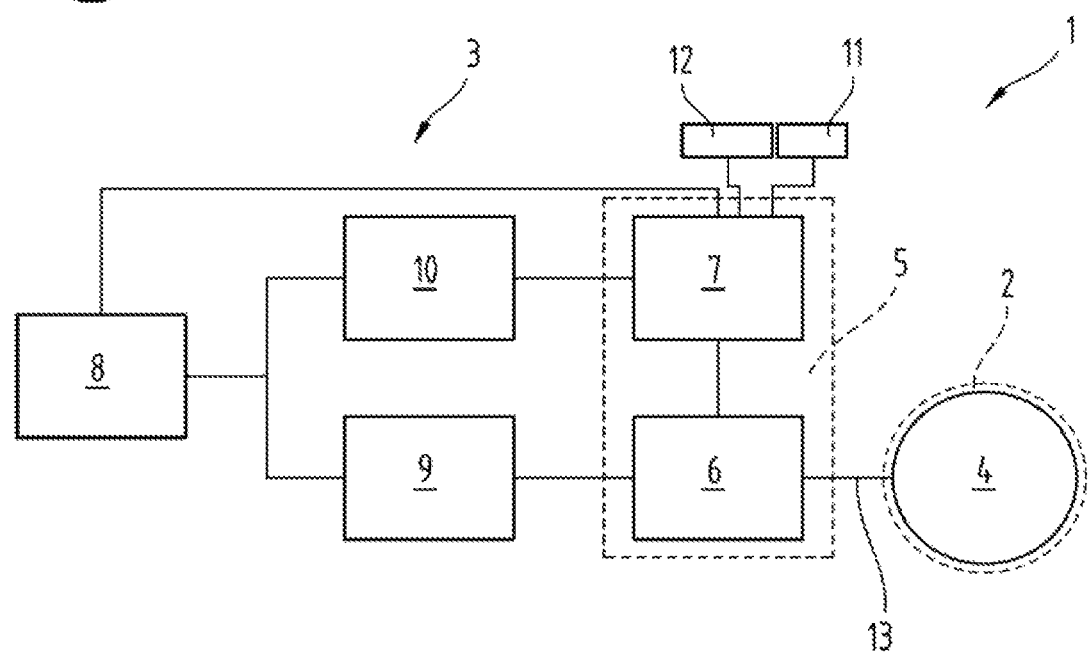
FIG. 1 is a block diagram of an attachment device according to the invention.

According to FIG. 1, an attachment device 1 according to the invention for a long-range optical device, such as a riflescope, a telescope or a binocular, comprises a window 2 transparent in a visible spectral range as well as an electrical heating device 3 for the window 2. The attachment device 1 may be put on an eyepiece or an objective lens of a long-range optical device and be fixed there.

The window 2 may be made of plastic material and/or glass and/or a ceramic and/or mineral and/or crystalline material, or comprise at least one of said materials. The window 2 may, for example, be made of a composite of layers of different materials, or monolithically of a conglomerate of different materials, or even of just one single material.

The heating device 3 comprises an electrically conductive heating layer 4 applied to a surface of the at least one window 2. The window with the at least one electrically conductive heating layer 4 may, in particular, have a transmittance of more than 80%, in particular of more than 90%, in the visible spectral range. Preferably, the electrically conductive heating layer 4 is a layer of one or multiple transparent, electrically conductive oxides. Such materials are also abbreviated as TCO ("transparent conducting oxides"). The layer may, for example, be made of indium tin oxide (ITO), antimony doped tin oxide (ATO), fluorine doped tin oxide (FTO), aluminum doped zinc oxide (AZO). Moreover, the layer 2 may also be embodied as a thin metal layer, for example with a layer thickness of less than 50 nm. Generally, any metal, in particular aluminum, silver or copper, may be used as the material for the metal layer.

The heating layer 4 may have a constant layer thickness. However, the layer thickness of the heating layer 4 may also vary. The layer thickness of the heating layer 4 preferably amounts to between 5 nm-250 nm, the sheet resistance preferably amounts to 2 to 10 ohm, in particular 4 to 6 ohm, the resulting overall resistance of the heating layer preferably amounts to 5 to 25 ohm, in particular 10 to 20 ohm.

The heating layer 2 is applied to a surface of the window 2. This surface, for example, may form an inner or outer side of the window 2, wherein the application onto the outer side of the window is particularly preferred. The inner side of the window 2 is the side facing the long-range optical device in a state in which the attachment device 1 is mounted on the long-range optical device. The outer side of the window 2 is the side facing the user. Preferably, the heating layer 2 covers at least 20%, in particular at least 30%, preferably at least 60%, particularly preferred at least 85%, for example 100%, of the surface of the window on which the heating layer 2 is applied.

When the heating device 3 is switched on, current flows through the heating layer 4, whereby the heating layer 4 is heated due to its electrical resistance and, in consequence, the temperature of the window 2 is increased, too. By the heating, the temperature on the surface of the window 2 is increased at least so high that it at least corresponds to the dew point temperature resulting from ambient air temperature and air humidity or exceeds it, whereby fogging of the window 2 can be prevented.

The heating device 3 may comprise a heating controller 5 which is configured to control the heating power, in particular a flow of current through the at least one heating layer 4. The heating power can be adjusted by changing the current flowing through the heating layer 4.

The heating controller 5 may comprise a pulse width modulator 6 and/or a processor 7. As mentioned above, any electronic component, which can be programmed and can evaluate data, such as an FPGA (field-programmable gate array), an ASIC, a microcontroller, a microprocessor or a digital signal processor DSP etc., is to be understood as a processor.

The heating device 3 is supplied by a voltage source 8, for example a battery or an accumulator.

The processor 7 may simultaneously also observe the state of the voltage source 8, such as its voltage and temperature, and derive the state of charge from this. The state of charge of the voltage source 8 may, for example, be optically displayed.

The heating power can be varied by the heating controller 5 as required, for example by pulse width modulation by means of the pulse width modulator 7. Of course, a continuous, non-pulsed operation in which a non-pulsed and regulated current flows through the heating layer is also possible. It is also possible to operate the heating layer 4 with a continuous voltage but to vary the level of the voltage (voltage regulation) and thus regulate the heating power. This can be done in a simple way by a variable DC-to-DC converter or another regulated voltage source.

It has proven to be advantageous if the heating layer 4 is operated at a higher first heating power for a first period of time when activated and continues to operate at a reduced and continuous second heating power after this period of time has elapsed. This has the effect that with the increased first heating power, an existing fogging can be quickly dissolved and with the continuous and reduced second heating power, a new fogging can be prevented.

The use of very short pulses can be considered a borderline case of the operation of the heating layer 4 in pulsed operation. In this regard, at very short time intervals, typically in the millisecond range, the heating layer is operated at significantly increased power compared to continuous operation, which results in an even more rapid heating of the surface. Depending on the duty factor, peak powers are conceivable which are higher by factor 10-500 than the power in continuous operation. In this regard, the average power can remain unchanged as compared to continuous operation.

Two stabilized voltages can be generated from the voltage of the voltage source 8, for example by means of the DC-to-DC converter 9, 10 (voltage converter). Hence, for example, one voltage (e.g. 2.5 V) can be generated for the operation of the processor 7 and a second voltage (e.g. 5 V) can be generated for supplying the heating layer 4, wherein the pulse width modulator 6 can be interposed between the second converter 9 and the heating layer 4 for varying the effective heating power.

Different states of charge of the voltage source 8 can be indicated by blinking and/or different colors of an LED display 11.

The heating device 3 can, for example, be manually switched on and off by means of a switch 12. Alternatively or additionally to the use of the switch 12, the heating device 3 can also be activated and/or deactivated, for example, depending on an inclinometer for detecting an inclination of the attachment device and/or on a proximity sensor for detecting whether a user is located at a predetermined distance from the window 2, and/or on a signal generated by a fogging sensor.

The heating controller 5 can react to the change of state functions of the environment in which the attachment device is used, such as temperature or air humidity. In other words, the heating power can be regulated and/or controlled depending on state functions of a use environment. In this regard, the heating power can be adjusted such that, at the surface of the window, there always is a temperature which is higher than the dew point temperature of the atmosphere, e.g. air, surrounding the attachment device and/or the long-range optical device. In this regard, the detection of the state functions required for regulating the heating power can be carried out by sensors connected to the heating controller 5, such as temperature sensors or humidity sensors. In this regard, the temperature sensor can be already integrated in the processor. If, for example, a temperature above 10° C. is registered, the heating can be dispensed with entirely. It is also conceivable that, in operation at a certain applied voltage, the resistance of the heating layer is determined based on the flowing current, and the temperature of the heating layer is directly determined from a known relationship between temperature and resistance of the heating layer and is used for the regulation of the heating power.

However, it is also possible that the heating power is maintained constant irrespectively of the surrounding conditions. In this case, the heating power is measured such that it prevents fogging of the window 2 up to a predetermined minimum reference external temperature, such as −20° C.

The electrically conductive heating layer 4 can be connected to a supply circuit via a flexible flat strip 13 with at least one conducting path 14 made of an electrically conductive material. However, the flat strip 13 can also be formed of an electrically conductive material, for example an electrically conductive plastic material.

Figure 5:
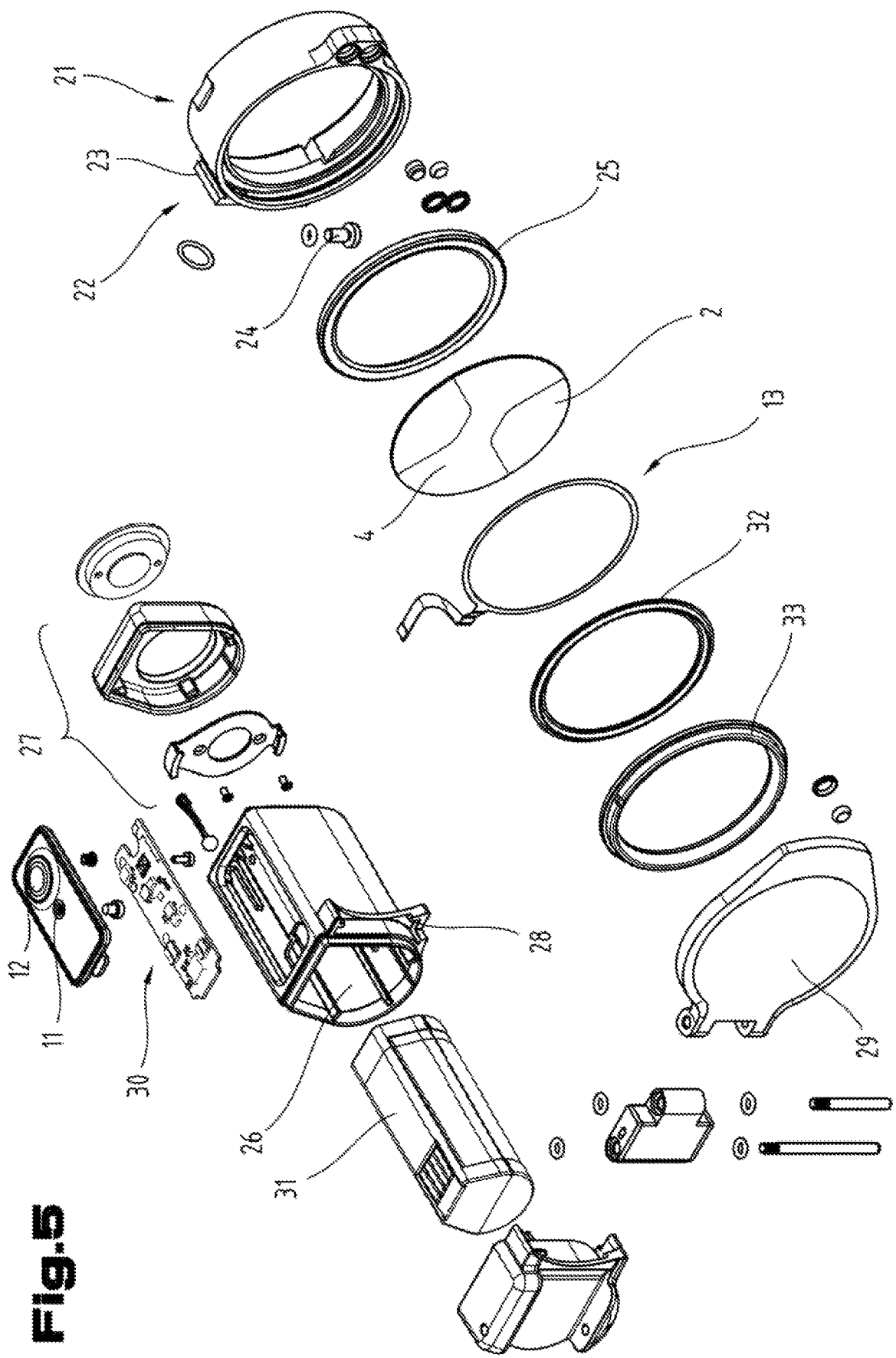
FIG. 5 is an exploded view of the attachment device of FIG. 4.

In the most simple case, the supply circuit can essentially comprise only the electrical connections of the voltage source 8. However, the supply circuit can also be embodied in a more complex way and comprise multiple components. According to FIG. 1, the supply circuit for example also comprises the DC-to-DC converter 9, 10 as well as the processor 7 and the pulse width modulator 6. In FIG. 5, the supply circuit is referred to using reference number 30.

Figure 2:
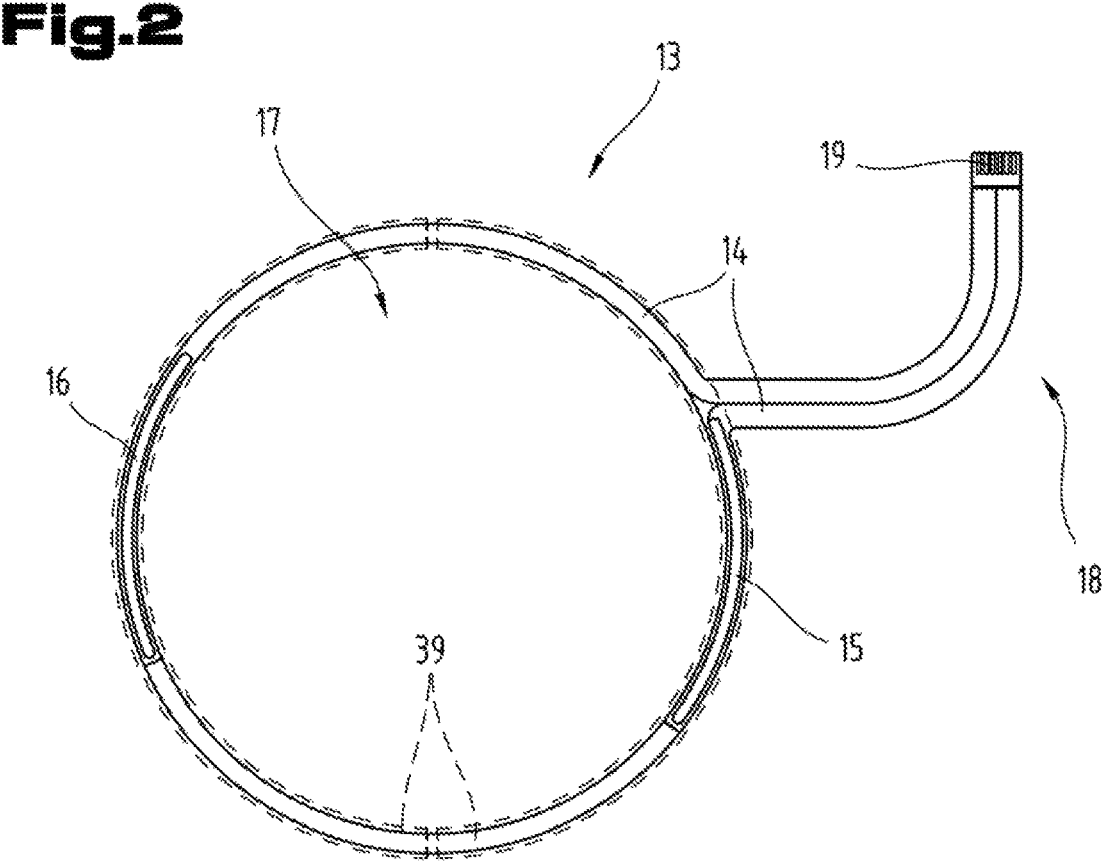
FIG. 2 is a flexible flat strip for electrical contacting of a heating layer of the attachment device of FIG. 1 applied to a pane.

As results from FIG. 2, the flexible flat strip 13 may comprise at least two contact points 15, 16 for electrically contacting the electrical heating layer 4. Moreover, the flexible flat strip 13 may also comprise a loop-shaped section 17. Preferably, the section 17 forms an eye through which a free view onto a central region of the window 2 is possible. The contact points 15, 16 are spatially separated from one another and arranged being opposite to one another at the section 17. A strip-shaped section 18, which is electrically connected to the supply circuit 30, for example via a "zero insertion force contact" (ZIF contact) 19, adjoins the loop-shaped section 17 of the flexible flat strip 13.

Figure 3:
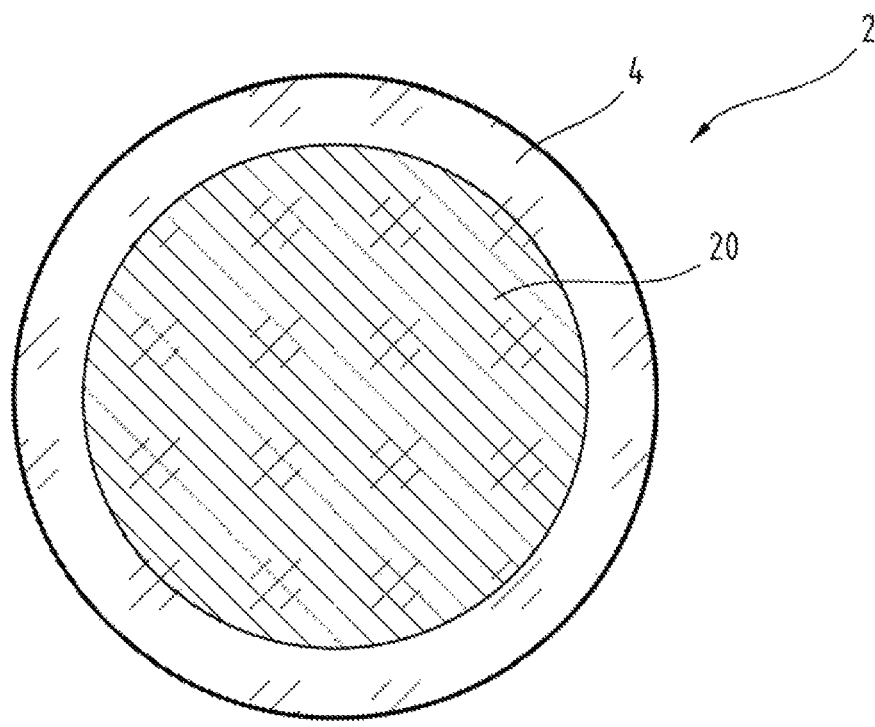
FIG. 3 is a top view onto a pane of the attachment device of FIG. 1 in closer detail.

According to FIG. 3, the window 2 may comprise a planar base surface and a planar top surface, wherein the base surface and the top surface are preferably embodied being plane parallel to one another. Furthermore, the window 2 may comprise an anti-reflective coating 20. Preferably, the window 2 is coated with the anti-reflective coating 20 on both sides, i.e. on the base surface and the top surface. On the side of the window 2 on which the heating layer 4 is applied, a region, in which an electrical contacting of the heating layer 4 is carried out, for example by the contact points 15, 16 of the flexible flat cable 13 shown in FIG. 2, remains free from the anti-reflective coating 20 to ensure good electrical contact. As can be seen from FIG. 3, the heating layer 4 is arranged between the anti-reflective coating 20 and the window 2.

Figure 6:
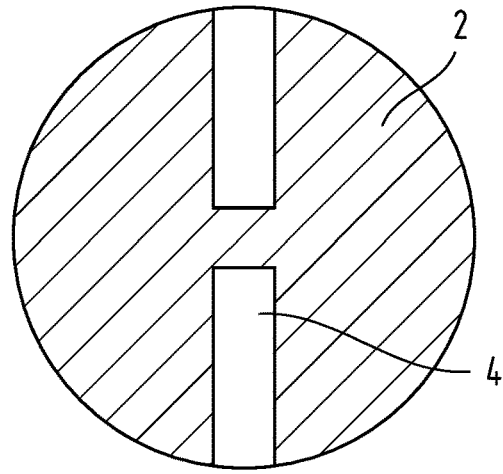
FIG. 6 is a top view of a variant of a pane of the attachment device of FIG. 1.
Figure 7:
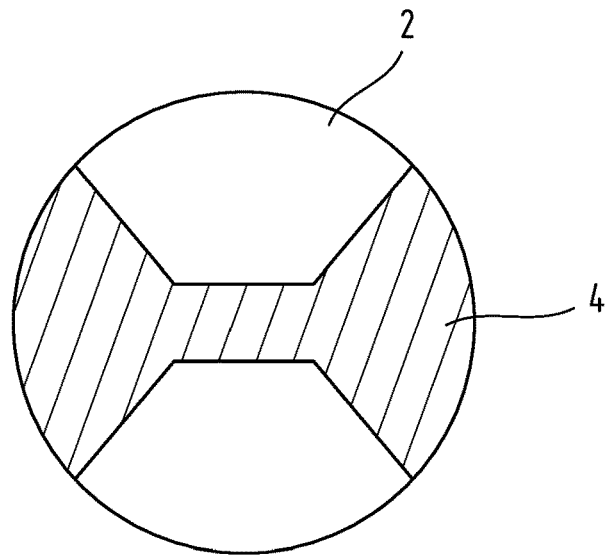
FIG. 7 is a top view of a further variant of a pane of the attachment device of FIG. 1.

In the exemplary embodiment shown in FIGS. 6-7, a width of the electrically conductive heating layer 4 can vary. At the locations at which the heating layer 4 becomes narrower as seen in parallel to the surface of the window 2, the resistance of the heating layer, at a constant layer thickness of the heating layer 4, locally increases as compared to wider regions. At these narrower locations, when a current flows, the heating layer 4 is heated more strongly due to the increased local resistance than in locations which are wider in comparison. By a change of the layer thickness, it is also possible to locally change and/or influence the resistance of the heating layer 4. What applies here is that at a location with a smaller layer thickness, the electrical sheet resistance and thus the heating power is locally increased as compared to locations of the heating layer 4 with a larger layer thickness but equal width. Hence, by varying the width and/or thickness of the heating layer 4 the local heating power can be adjusted in a targeted manner.

Figure 4:
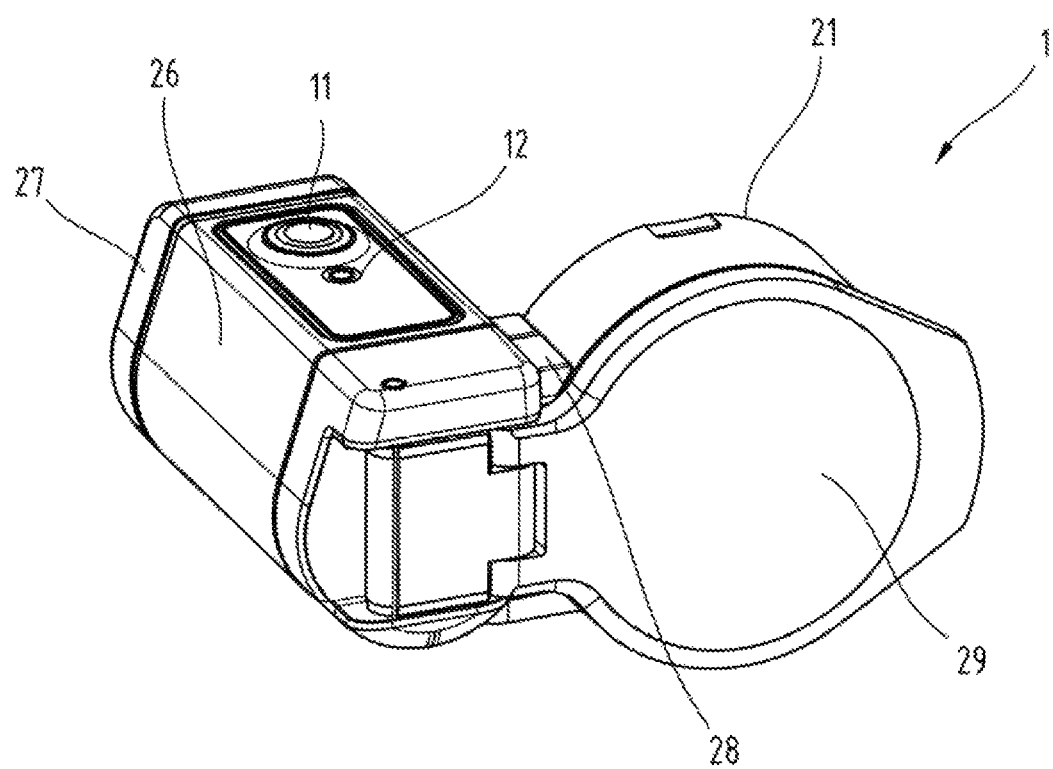
FIG. 4 is a perspective view of an attachment device according to the invention.
Figure 8:
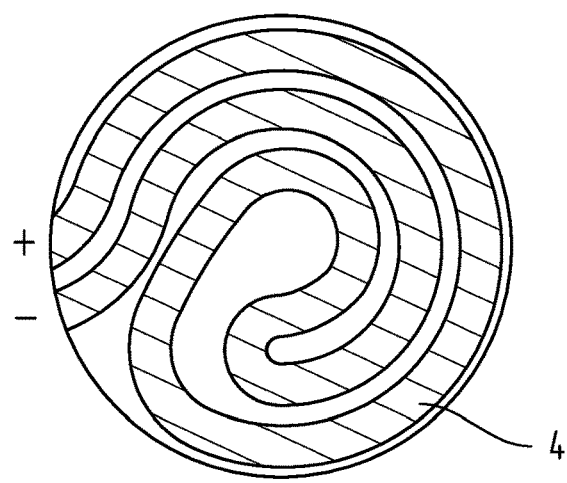
FIG. 8 is a top view of a further variant of a pane of the attachment device of FIG. 1.

FIG. 8 shows an alternative embodiment of the heating layer 4. This allows for the electrical contacting to be carried out from one side of the window 2. The local heating performance in the middle of the window 2 as compared to the edge may also be increased by a local variation of the width of the heating layer strip, for example less wide in the middle of the window 2 than towards the edge, or by changing the local surface density of the heat conducting paths, for example more paths may extend in the middle of the window 2 than towards the edge of the window 2. According to FIG. 4, the attachment device 1 comprises a housing having at least one tube-shaped section 21. As shown in FIG. 5, the window 2 is received in the tube-shaped section 21. A diameter of the window 2 is preferably larger than an axial length of the tube-shaped section 21.

The tube-shaped section 21 may comprise a clamping device 22 for fastening to the at least one eyepiece or at least one objective lens. It can, for example, be a clamping ring 23 changeable in terms of its diameter, the diameter of which can be changed by means of a screw 24.

The attachment device 1 may further comprise a seal 25 which insulates an edge of the window 2 thermally and/or against the ingress of moisture or foreign objects. In a receiving compartment 26, in which electrical connecting points for the voltage source 8 are located, an electrical energy storage 31, for example in the form of an accumulator or a battery, may be provided as the voltage source 8. However, the receiving compartment 26 can also provide space and electrical connections for multiple energy storages 31. The receiving compartment 26 can be closed with a cover 27.

The receiving compartment 26 can be connected to the tube-shaped section 21 via a web 28. A longitudinal extension of the tube-shaped section 21 and a longitudinal extension of the receiving compartment 26 can extend in parallel to one another.

The window 2 can be entirely covered and protected by means of a pivotably mounted cover 29. The cover 29 may, for example, be mounted to the receiving compartment 26 and may form a hinge joint, in particular a double hinge joint. Alternatively, the cover 29 may also be mounted directly on the tube-shaped section 21 of the housing of the attachment device. In general, it applies that the cover 29 is pivotably mounted on the housing of the attachment device 1. In this regard, the housing of the attachment device 1 comprises both the tube-shaped section 21 as well as the web 28 and the receiving compartment 26 including the cover 27.

By means of a ring 32 and a holding ring 33 which can be screwed, snapped and/or bonded into the tube-shaped section 21 of the housing, the flexible flat strip 13 can be fixed in relation to the window 2 and the contact surfaces 15, 16 can be pressed against the heating layer 4. Here, the ring 32 assumes the function of a washer.

To improve the long-term stability and the reduce switching losses, contacting between the contact surfaces 15, 16 and the heating layer 4 can be established by means of a conductive and double-sided adhesive tape 39, which is applied between the contact surfaces 15, 16 and the heating layer 4. Moreover, the attachment device 1 may be configured to activate the heating device 3 and heat the window 2 when the cover 29 is pivoted from a position covering the window 2 into a position releasing the window 2 and/or to deactivate the heating device 3 again when the cover 29 is closed. In this case, a switch can be actuated when the cover is moved and the heating device 3 can thereby be turned on or off.

Figure 9:
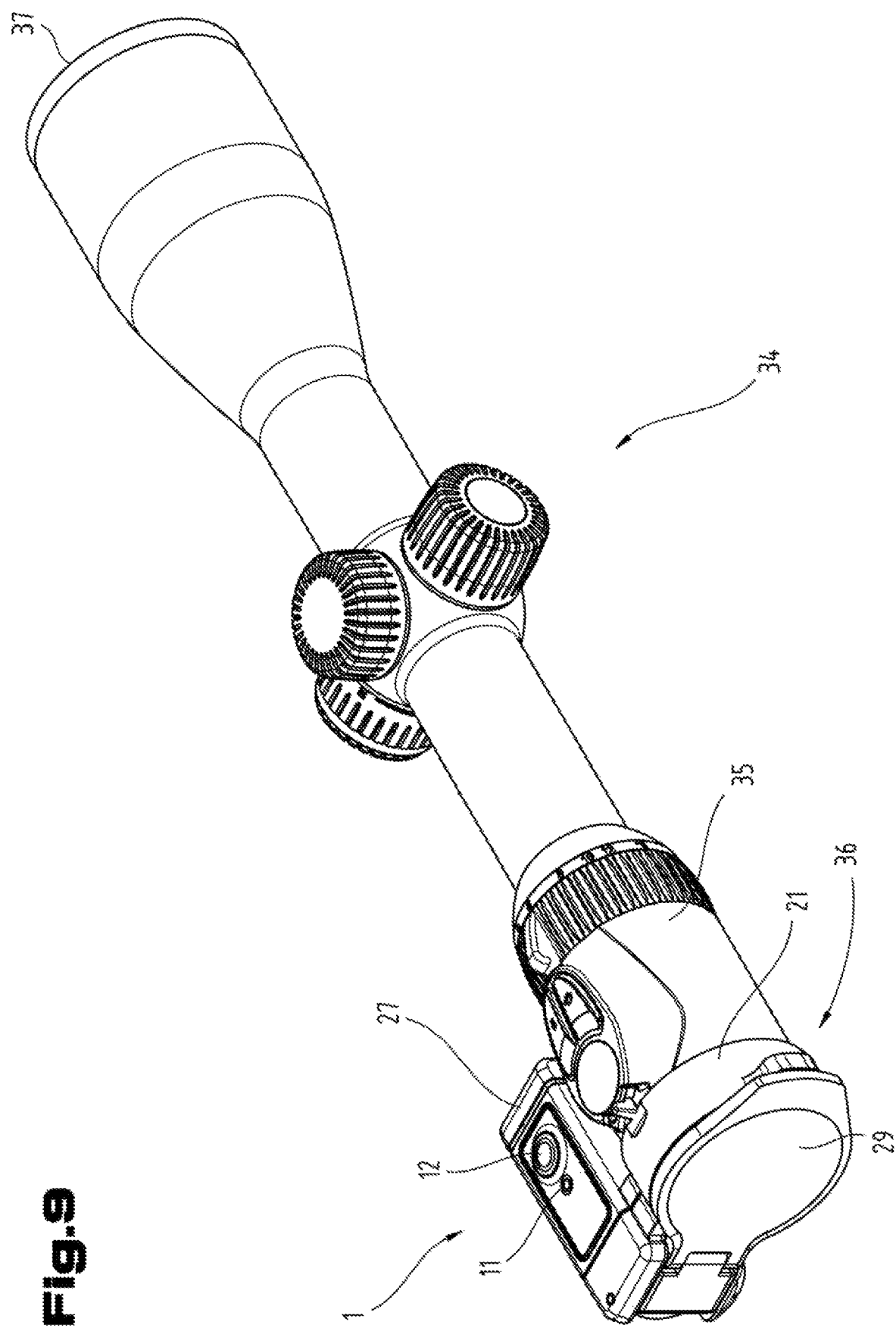
FIG. 9 is a perspective view of the long-range optical device with the attachment device of FIG. 1.

As can be seen from FIG. 9, the attachment device 1 may be embodied as a push-on lid for a long-range optical device 34, here a riflescope. The long-range optical device, generally and without any limitation to a specific type of a long-range optical device, comprises at least one eyepiece and at least one objective lens.

As can be seen from FIG. 9, the attachment device 1 in the present representation is arranged on the eyepiece side of a housing 35 of the long-range optical device 34 and entirely covers the eyepiece 36 from the surrounding. However, the attachment device 1 may also be arranged on the objective side of the housing 35 of the long-range optical device 34 and entirely cover the objective lens 37.

In an eyepiece-side arrangement of the attachment device 1 on the housing 35, as is shown in FIG. 9, a distance between the window 2 and an eyepiece of the long-range optical device 34 preferably amounts to a maximum of 10 mm, in particular to a maximum of 5 mm.

Figure 10:
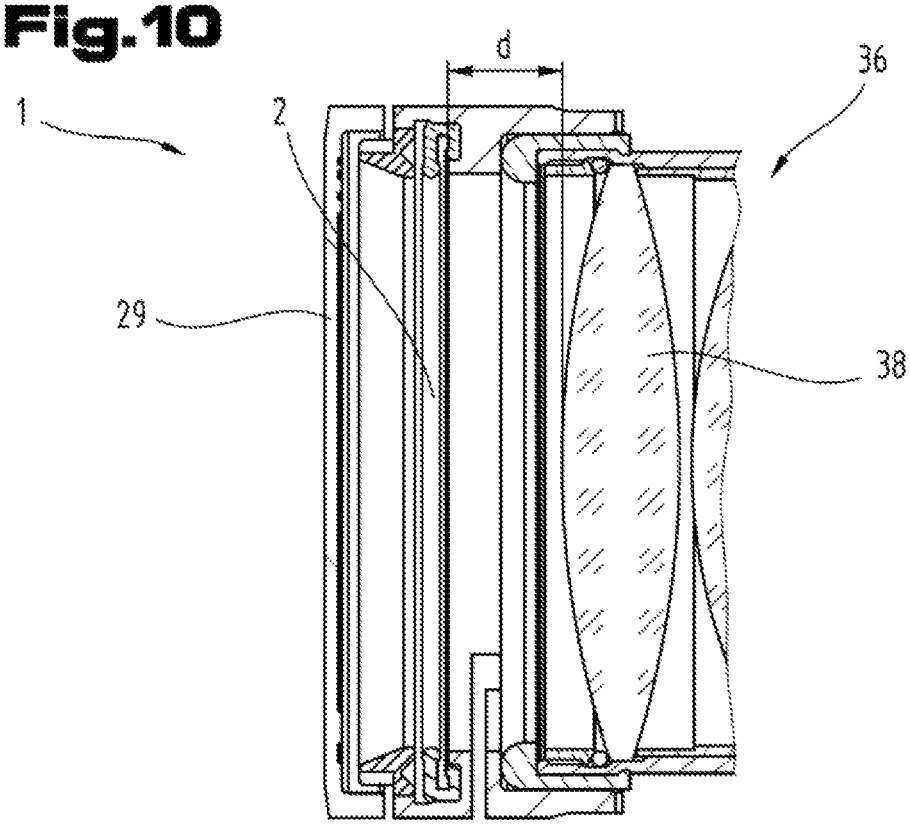
FIG. 10 is a longitudinal section through the region around the eyepiece of the long-range optical device of FIG. 9.

For this purpose, according to FIG. 10, a distance d between an eyepiece 36 facing side of the window 2 of the attachment device 1 and a window facing outer side of an eyepiece 36 closing lens 38 of the long-range optical device can amount to a maximum of 20 mm, in particular to a maximum of 10 mm.

Figure 11:
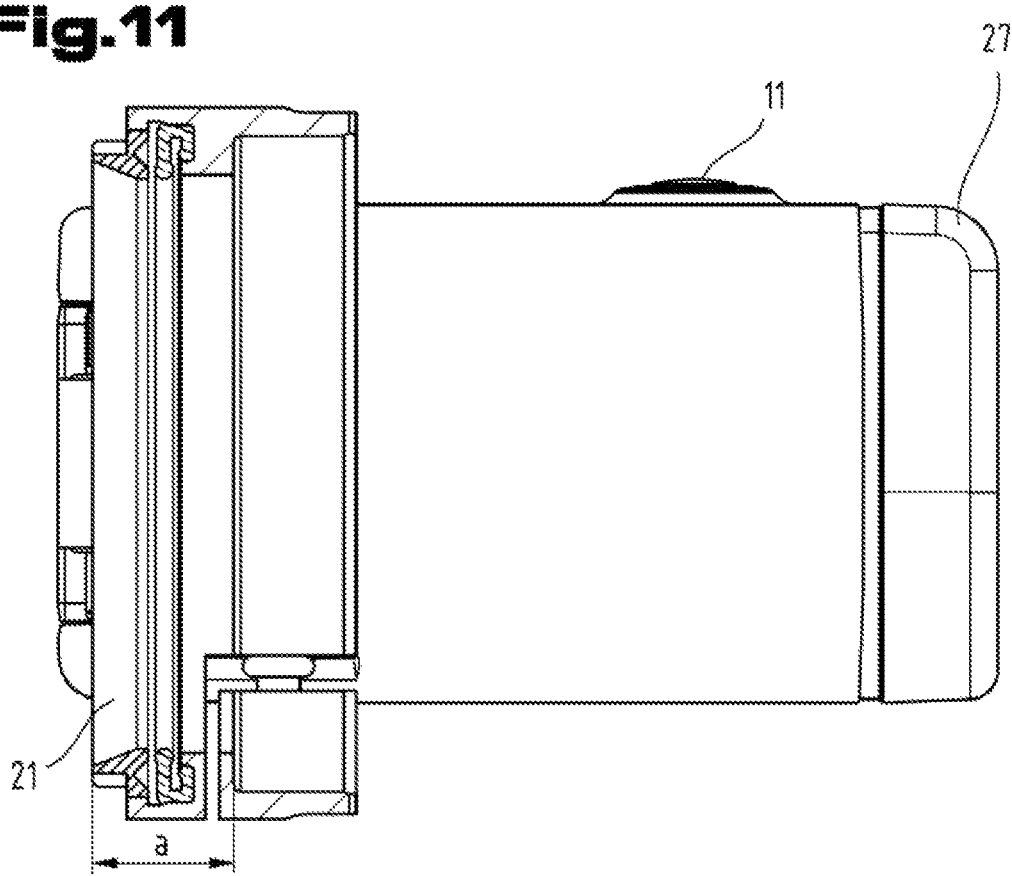
FIG. 11 is a section through the region of the attachment device receiving the eyepiece of the long-range optical device with the protective cover being open.

In particular, as shown in FIG. 11, an outermost user facing surface or edge of the tube-shaped section 21 of the attachment device 1 when mounted on the eyepiece 36, may project by no more than 25 mm, in particular by no more than 15 mm, over an outermost user facing surface or edge of the long-range optical device. A distance between the outermost user facing surface or edge of the long-range optical device and the outermost user facing surface or edge of the tube-shaped section 21 of the attachment device 1, is indicated as a in FIG. 11. Hence, as already mentioned above, it can be ensured that the safety distance between the head of the shooter and the riflescope with the attachment device, which is required to prevent injuries during recoil when a firearm is fired and on which the riflescope is mounted, is not significantly reduced when the attachment device 1 is mounted to the eyepiece 36 of a riflescope.

The invention claimed is:

1. An attachment device for at least one objective lens and/or at least one eyepiece of a long-range optical device, wherein the attachment device comprises at least one window, which is transparent at least in a visible spectral range, at least one electrical heating device for the window, and at least one electrically conductive heating layer applied to a surface of the at least one window, wherein the at least one electrical heating device comprises at least one heating controller which is configured to control a heating power by regulating a flow of current through the at least one electrically conductive heating layer, and wherein the at least one heating controller comprises at least one processor and/or at least one pulse width modulator, and wherein the at least one window with the at least one electrically conductive heating layer has a transmittance of more than 80% in the visible spectral range.

2. The attachment device according to claim 1, wherein the electrically conductive heating layer has a constant layer thickness, and wherein the electrically conductive heating layer is applied to at least one surface of the at least one window, and covers at least 20% of the at least one surface of the at least one window.

3. The attachment device according to claim 1, wherein the at least one window may comprise a planar base surface and a planar top surface, wherein the base surface and the top surface are parallel to one another.

4. The attachment device according to claim 1, wherein the at least one window comprises at least one anti-reflective coating, on at least one side.

5. The attachment device according to claim 1, wherein the electrically conductive heating layer is made of at least one metal and/or at least one transparent, electrically conductive oxides.

6. The attachment device according to claim 1, wherein the at least one window is made of at least one plastic material and/or at least one glass and/or at least one ceramic and/or mineral and/or crystalline material, or comprises at least one of said materials.

7. An attachment device for at least one objective lens and/or at least one eyepiece of a long-range optical device, wherein the attachment device comprises at least one window, which is transparent at least in a visible spectral range, at least one electrical heating device for the window, and at least one electrically conductive heating layer applied to a surface of the at least one window, wherein a width and/or a layer thickness of the at least one electrically conductive heating layer varies.

8. An attachment device for at least one objective lens and/or at least one eyepiece of a long-range optical device, wherein the attachment device comprises at least one window, which is transparent at least in a visible spectral range, at least one electrical heating device for the window, and at least one electrically conductive heating layer applied to a surface of the at least one window, wherein the electrically conductive heating layer is connected to a supply circuit via at least one flexible flat strip with at least one conducting path and/or made of an electrically conductive material.

9. The attachment device according to claim 8, wherein the at least one flexible flat strip comprises at least two contact points for electrically contacting the electrically conductive heating layer.

10. The attachment device according to claim 8, wherein the at least one flexible flat strip comprises a loop-shaped section forming an eye in the region of the at least one window allowing a free view at least on a central section of the at least one window, wherein the at least two contact points are arranged on the loop-shaped section.

11. The attachment device according to claim 10, wherein at least one strip-shaped section, which is electrically connected, in particular via a ZIF contact, to the supply circuit, adjoins the loop-shaped section of the flexible flat strip.

12. An attachment device for at least one objective lens and/or at least one eyepiece of a long-range optical device, wherein the attachment device comprises at least one window, which is transparent at least in a visible spectral range, as well as at least one electrical heating device for the window, wherein the attachment device is embodied as a push-on lid for the at least one eyepiece and/or at least one objective lens of the long-range optical device.

13. The attachment device according to claim 12, further comprising at least one seal insulating at least one edge of the at least one window thermally and/or against the ingress of moisture or foreign objects.

14. An attachment device for at least one objective lens and/or at least one eyepiece of a long-range optical device, wherein the attachment device comprises at least one window, which is transparent at least in a visible spectral range, as well as at least one electrical heating device for the window, wherein the attachment device comprises a housing with at least one tube-shaped section, wherein the at least one window is received in the tube-shaped section, wherein a diameter of the at least one window is preferably larger than a length of the tube-shaped section.

15. The attachment device according to claim 14, wherein the tube-shaped section comprises at least one clamping device for fastening to the at least one eyepiece or at least one objective lens.

16. An attachment device for at least one objective lens and/or at least one eyepiece of a long-range optical device, wherein the attachment device comprises at least one window, which is transparent at least in a visible spectral range, at least one electrical heating device for the window, and at least one receiving compartment, which can be closed by at least one cover, for an electrical energy storage serving as a voltage source for at least one battery or for at least one accumulator.

17. The attachment device according to claim 16, wherein the receiving compartment for the electrical energy storage is connected, via a web, with the tube-shaped section.

18. The attachment device according to claim 17, wherein a longitudinal extension of the tube-shaped section and a longitudinal extension of the receiving compartment extend in parallel to one another.

19. An attachment device for at least one objective lens and/or at least one eyepiece of a long-range optical device, wherein the attachment device comprises at least one window, which is transparent at least in a visible spectral range, at least one electrical heating device for the window, and at least one pivotably mounted cover for the at least one window.

20. The attachment device according to claim 19, wherein the at least one electrical heating device is configured to activate and heat the at least one window when the cover is pivoted from a position covering the at least one window into a position releasing the at least one window and/or to deactivate the at least one electrical heating device when the cover is closed.

21. An attachment device for at least one objective lens and/or at least one eyepiece of a long-range optical device, wherein the attachment device comprises at least one window, which is transparent at least in a visible spectral range, as well as at least one electrical heating device for the window, and wherein the at least one electrical heating device is configured to activate and/or deactivate depending on at least one signal generated by at least one inclinometer and/or at least one proximity sensor and/or at least one fogging sensor.

22. A long-range optical device, wherein the long-range optical device comprises at least one attachment device for at least one objective lens and/or at least one eyepiece of the long-range optical device, wherein the attachment device comprises at least one window, which is transparent at least in a visible spectral range, as well as at least one electrical heating device for the window, wherein the attachment device is arranged on the eyepiece side of a housing of the long-range optical device or on the objective side of the housing of the long-range optical device and at least one eyepiece or at least one objective lens of the long-range optical device is covered from a surrounding by the attachment device.

23. The long-range optical device according to claim 22, wherein an eyepiece-side arrangement of the attachment device on the housing of the long-range optical device, a distance between the at least one window and the eyepiece of the long-range optical device amounts to a maximum of 10 mm.

24. The long-range optical device according to claim 22, wherein a distance (d) between an eyepiece facing side of the window of the attachment device and a window facing outer side of an eyepiece closing lens of the long-range optical device can amount to a maximum of 20 mm.

25. The long-range optical device according to claim 22, wherein an outermost user facing surface or edge of the tube-shaped section of the attachment device when mounted on the eyepiece projects by no more than 25 mm over an outermost user facing surface or edge of the long-range optical device.

* * * * *